United States Patent
Claypool

(10) Patent No.: US 10,173,875 B2
(45) Date of Patent: *Jan. 8, 2019

(54) PLATFORM TRUCK FOR CATENARY WIRE INSTALLATION AND METHOD OF USE

(71) Applicant: Mass. Electric Construction Co., Omaha, NE (US)

(72) Inventor: James Claypool, Bellevue, NE (US)

(73) Assignee: Mass Electric Construction Co., Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/882,078

(22) Filed: Oct. 13, 2015

(65) Prior Publication Data

US 2017/0101297 A1    Apr. 13, 2017

(51) Int. Cl.
| | | |
|---|---|---|
| *B66F 11/04* | (2006.01) | |
| *B60M 1/28* | (2006.01) | |
| *B66F 13/00* | (2006.01) | |
| *B66F 17/00* | (2006.01) | |

(52) U.S. Cl.
CPC ............ *B66F 11/04* (2013.01); *B60M 1/28* (2013.01); *B66F 13/00* (2013.01); *B66F 17/006* (2013.01)

(58) Field of Classification Search
CPC .......... E06C 7/003; A62B 35/04; E04G 1/20; E04G 1/22
See application file for complete search history.

(56) References Cited

U.S. PATENT DOCUMENTS

| | | | | |
|---|---|---|---|---|
| 2,757,756 A | * | 8/1956 | Warry | B66B 9/16 |
| | | | | 187/243 |
| 3,263,628 A | | 8/1966 | Grove | |
| 3,332,362 A | | 7/1967 | Fisher | |
| 3,414,086 A | * | 12/1968 | Ulinski | B66F 9/08 |
| | | | | 187/230 |
| 3,442,351 A | * | 5/1969 | Parrish | E04G 1/22 |
| | | | | 182/141 |
| 3,653,332 A | | 4/1972 | Olson, Sr. et al. | |
| 3,664,459 A | * | 5/1972 | Stephens | B66F 11/042 |
| | | | | 182/141 |

(Continued)

FOREIGN PATENT DOCUMENTS

| | | | | |
|---|---|---|---|---|
| AU | 2010100896 | | 9/2010 | |
| CA | 2398132 A1 | * | 2/2004 | ............ B66F 11/042 |

(Continued)

OTHER PUBLICATIONS

Article; 'Optimised catenary maintenance measures on Austrian Federal Railways' to Rail Engineering International Edition 2002 No. 1, Jun. 6, 2002 (Jun. 6, 2002) entire document, especially fig. 7, p. 15-16 (6 pgs.).

(Continued)

*Primary Examiner* — Katherine W Mitchell
*Assistant Examiner* — Candace L Bradford
(74) *Attorney, Agent, or Firm* — DLA Piper LLP (US)

(57) ABSTRACT

A truck and method for installing catenary wire are disclosed in which the truck may have a platform with a greater capacity than conventional systems. The truck may further comprise a set of guard rails that can be moved from a stowed position to an extended position and locked into the extended position.

8 Claims, 13 Drawing Sheets

(56) References Cited

U.S. PATENT DOCUMENTS

| | | | |
|---|---|---|---|
| 3,961,681 A * | 6/1976 | Fisher | B60P 1/02 180/305 |
| 4,048,925 A | 9/1977 | Storm | |
| 4,088,203 A * | 5/1978 | Smith, Jr. | B66F 11/042 182/141 |
| 4,222,332 A | 9/1980 | Newman | |
| 4,456,093 A * | 6/1984 | Finley | B66F 17/006 182/18 |
| 5,114,119 A | 5/1992 | Theurer et al. | |
| 5,161,312 A | 11/1992 | Theurer et al. | |
| 5,186,109 A | 2/1993 | Madison | |
| 5,220,870 A | 6/1993 | Larson | |
| 5,636,705 A * | 6/1997 | St-Germain | B66F 11/04 182/141 |
| 5,826,860 A * | 10/1998 | Theurer | B60M 1/28 254/134.3 R |
| 5,850,892 A * | 12/1998 | Citron | B66F 11/04 182/148 |
| 5,930,904 A * | 8/1999 | Mualem | G01C 5/00 33/1 Q |
| 6,007,050 A * | 12/1999 | Theurer | B60M 1/28 254/134.3 R |
| 6,830,127 B2 * | 12/2004 | Johnson | E02D 29/12 182/113 |
| 6,932,173 B2 | 8/2005 | Henderson | |
| 7,406,919 B2 * | 8/2008 | Coots | B61D 15/00 104/154 |
| 8,527,327 B1 | 9/2013 | Lawrence | |
| 9,484,721 B2 | 11/2016 | Claypool | |
| 2007/0078792 A1 | 4/2007 | Chen | |
| 2011/0213631 A1 | 9/2011 | Mislaysky | |
| 2012/0018253 A1 * | 1/2012 | Taberah | B66B 9/187 182/141 |
| 2013/0103235 A1 * | 4/2013 | Lee | B60W 10/08 701/22 |
| 2013/0320900 A1 * | 12/2013 | Daigle | H02P 23/0063 318/434 |
| 2014/0229212 A1 | 8/2014 | Macelheron et al. | |
| 2016/0048785 A1 | 2/2016 | Dommarajukrishnamaraju | |

FOREIGN PATENT DOCUMENTS

| | | | |
|---|---|---|---|
| CA | 2398132 A1 * | 2/2004 | B66F 11/042 |
| CA | 2499611 | 2/2004 | |
| WO | WO 95/29822 | 11/1995 | |

OTHER PUBLICATIONS

PCT Invitation to Pay Additional Fees and, Where Applicable, Protest Fee of PCT/US14/46915; dated Oct. 31, 2014; (2 pgs.).
PCT International Search Report of PCT/US14/46915; dated Jan. 21, 2015; (4 pgs.).
PCT Written Opinion of the International Searching Authority of PCT/US14/46915; dated Jan. 21, 2015; (5 pgs.).

* cited by examiner

PLATFORM TRUCK FOR CATENARY WIRE INSTALLATION AND METHOD OF USE

FIELD

The disclosure relates generally to a method for installing, maintaining and repairing wire and in particular to a truck and method for installing, maintaining and repairing catenary wire.

BACKGROUND

Catenary is used to provide a way to power an electricity powered transportation system. For example, FIG. 1 illustrates a typical catenary wire installation for an electricity powered train that runs on a set of tracks 101. The wire follows along the set of tracks and may be supported by one or more support posts 102 that are installed adjacent to the set of tracks 101 at periodic intervals. The one or more support posts 102 may each have a set of cantilever arms 106 that extend away from the support post, have insulators and hold the various wires described below. The wire may include a messenger wire 103 (that carries current and supports the contact wire) that is strung between the support posts 102, one or more dropper segments 104 that support a contact wire 105 that hangs down from the messenger wire 103 and is electrified so that an electric powered transportation system may contact the contact wire 105 that travels along the set to tracks 101 to power the transportation system.

In a typical system, a truck may have one or more rail gears that allow the truck to run along a set of tracks over which the catenary wire is to be installed. While the truck is running along the tracks, a person is typically still inside of the truck "driving" the truck. The typical truck has a platform on which a second person may stand to install the catenary wire while the truck is being driven by the person driving the truck.

In the typical truck, since the platform has to extend out away from the center of the truck to install the support posts and connect the catenary wires to the support post, the truck typically requires outriggers to maintain the stability of the truck during the installation process. In the typical systems, there is some mechanism to work with and perform the wire installation including the wire positioning, but that mechanism is difficult to work with. The wire installation may include holding the contact wire and catenary wire while working on the cantilever arms and/or the insulators that insulate the electrified contact wire from the support posts.

Once the wires are installed, it is necessary to measure the height and stagger of the contact wire above the top of rail. In typical systems, this may be done from the truck over the cab or using a trailer pulled behind the truck.

DETAILED DESCRIPTION OF ONE OR MORE EMBODIMENTS

The disclosure is particularly applicable to a truck as shown and described below with rail gears that may be used for installing catenary wire and it is in this context that the disclosure will be described. It will be appreciated, however, that the truck has greater utility and may also be used to install different types of wire and may be used to install wire that is not adjacent to a set of tracks.

Figure 1:
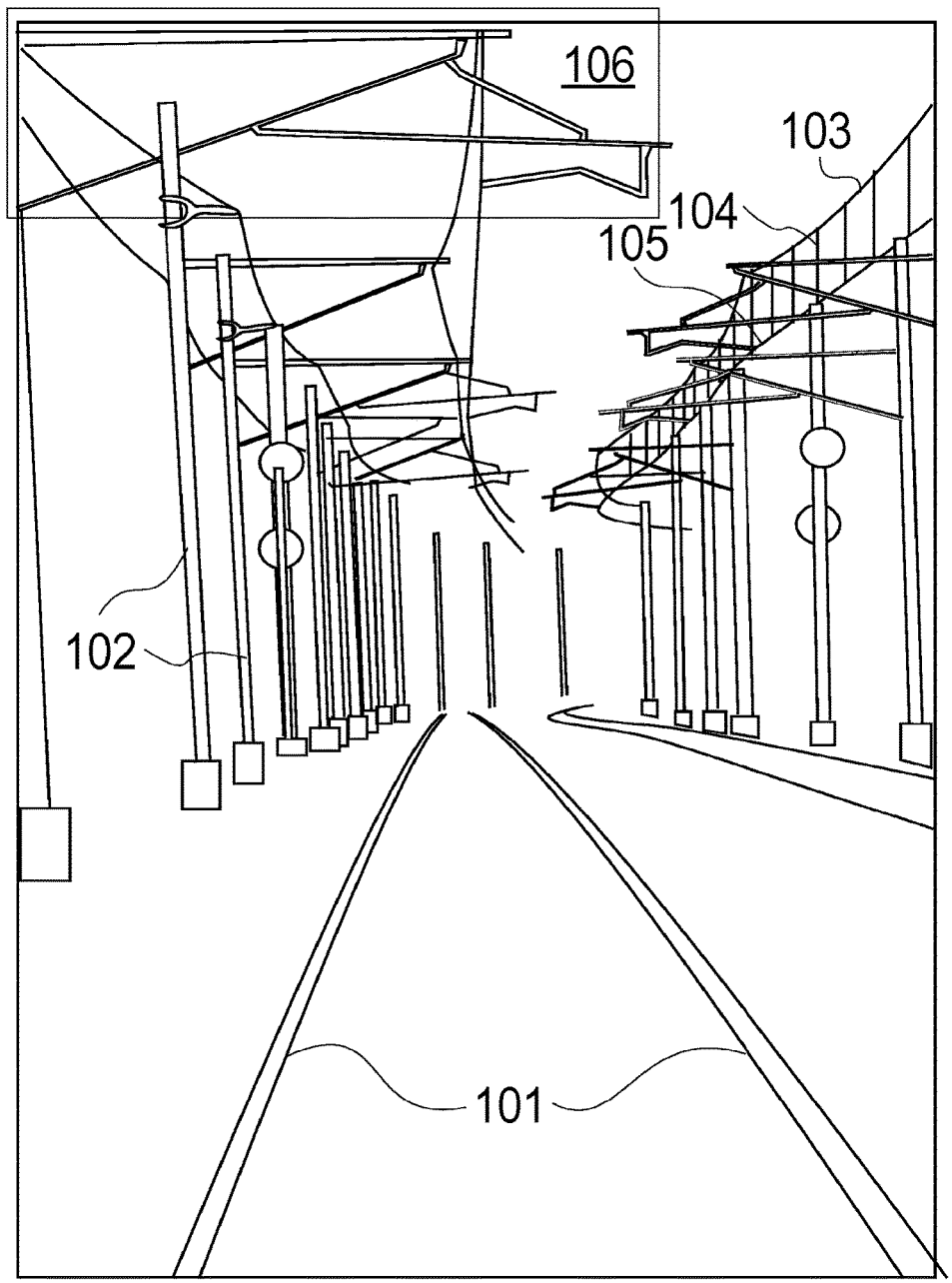
FIG. 1 illustrates an example of catenary wire transportation system.
Figure 2:
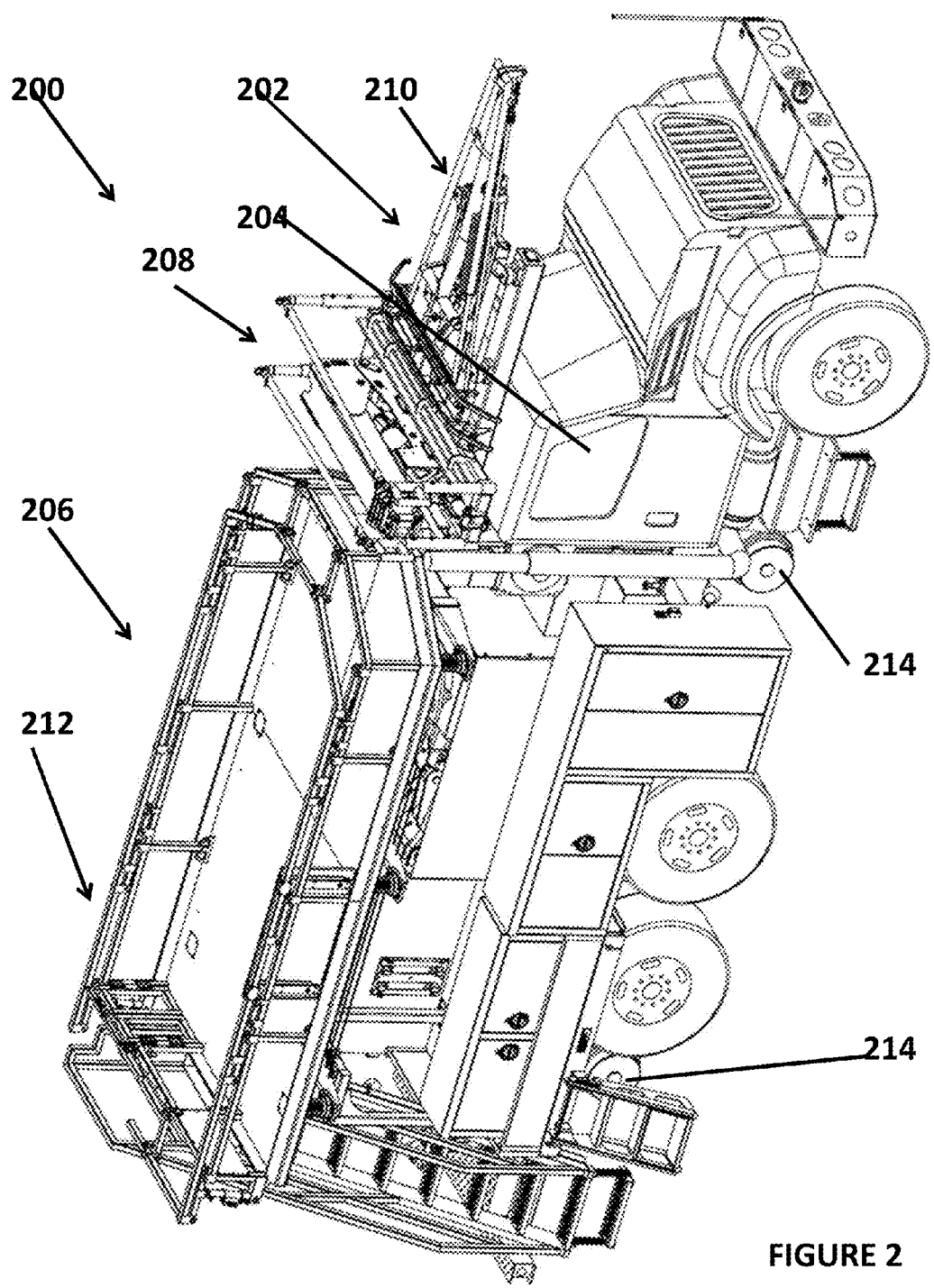
FIGS. 2 and 3 are an isometric view and side view, respectively, of a catenary platform truck that may be used to install and maintain catenary wires.
Figure 3:
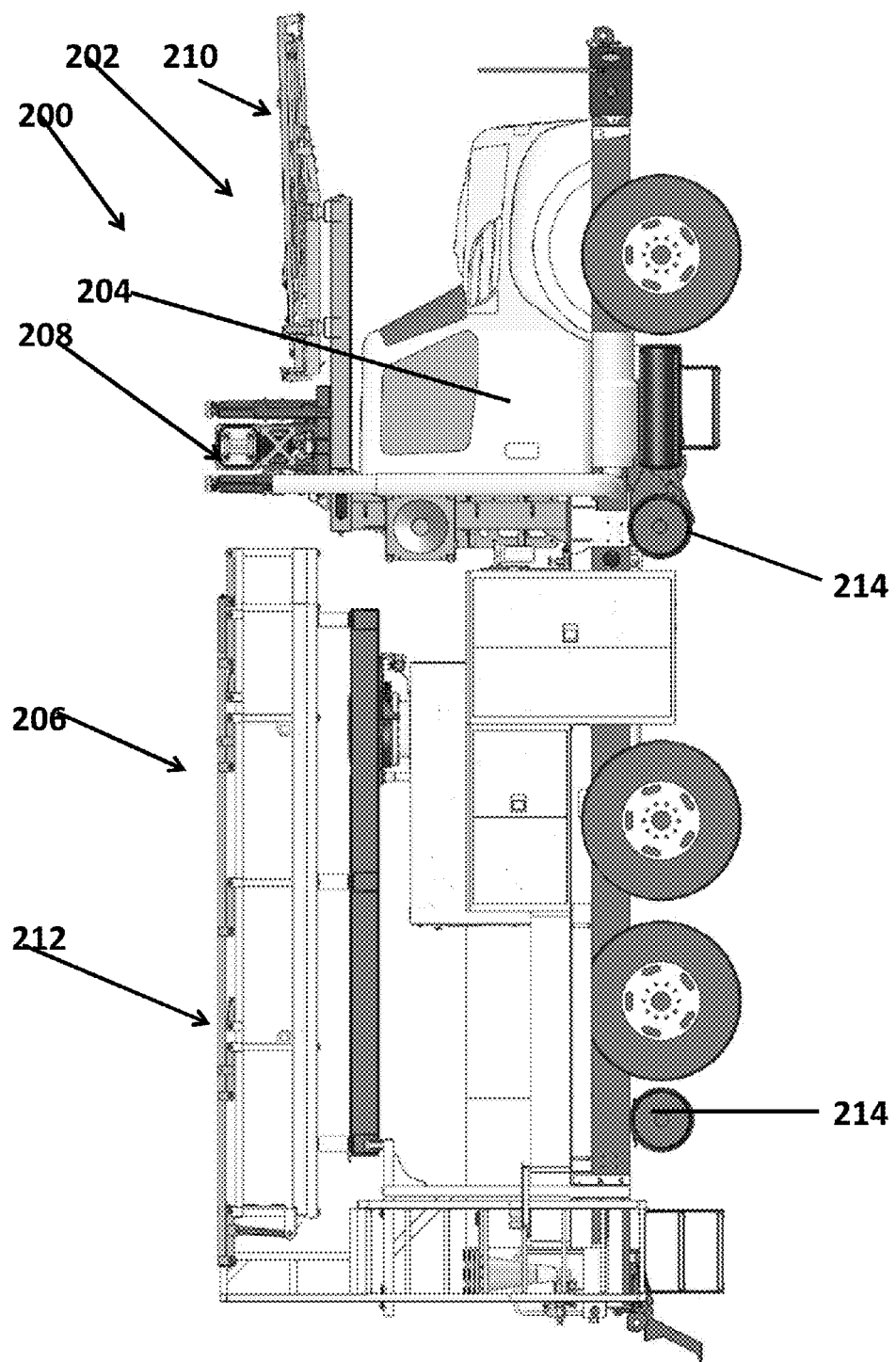
Figure 4:
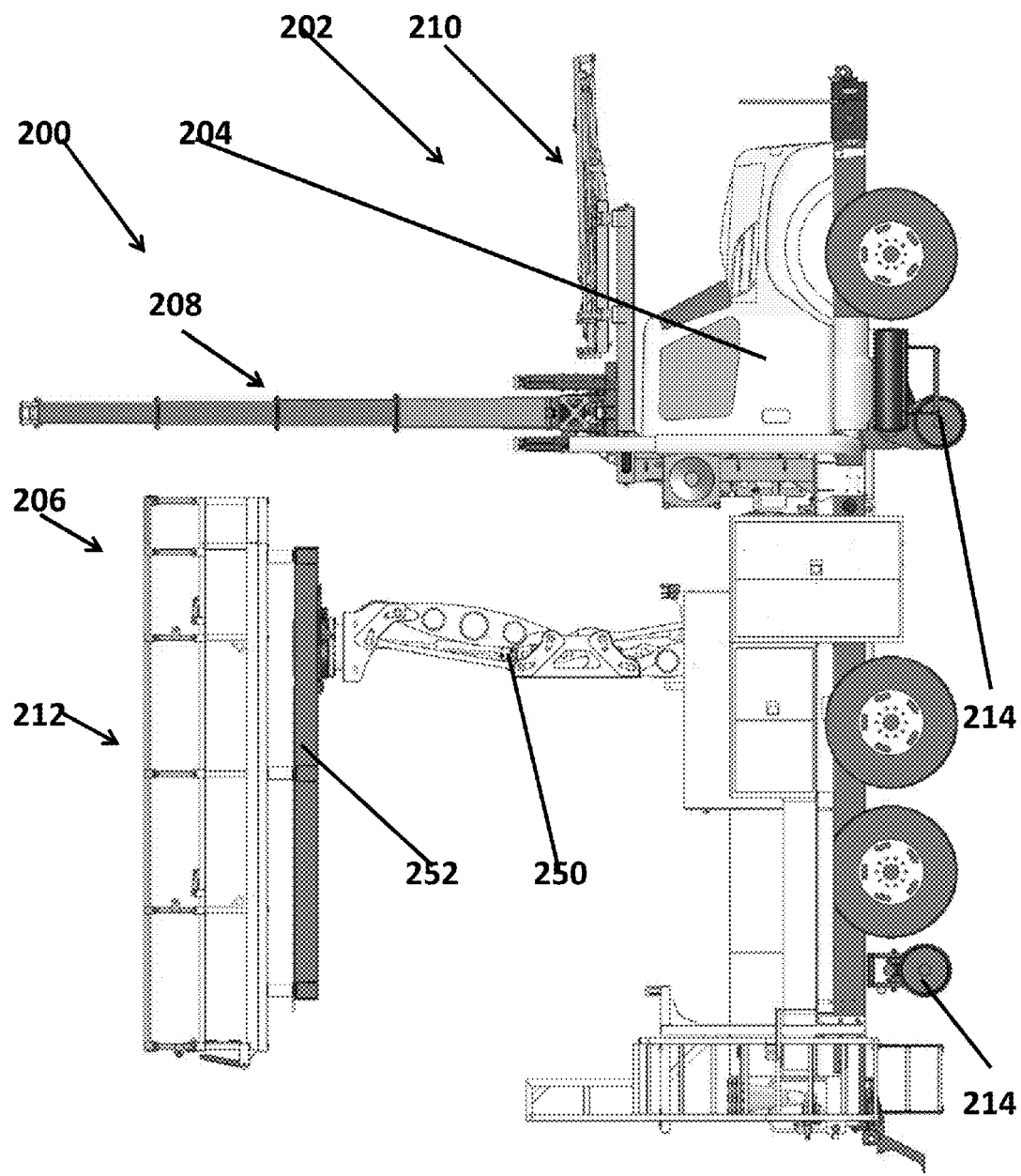
FIG. 4 shows the catenary platform truck with the elevator platform and a wire manipulator extended.

FIGS. 2-4 are an isometric view and side view, respectively, of a catenary platform truck 200 that may be used to install and maintain catenary wires. Unlike typical trucks, the platform associated with the truck, as described below, may be rotated relative to the truck body using an elevator lifting mechanism as described below. The catenary wire installation truck 200 that may be built based on a typical truck 202, such as a Navistar brand truck, that may have a cab portion 204 and a platform portion 206 as shown. The catenary wire installation truck 200 may also have a wire manipulator 208, such as the two wire manipulators, a contact wire measuring device 210 and a platform. Further details of these elements are described in co-pending U.S. patent application Ser. No. 13/963,868 which is incorporated herein by reference. The one or more wire manipulators 208 may be mounted above the roof of the cab portion, such as on a platform and may be used to hold either or both of the catenary wire or contact wire as shown in FIG. 1. The contact wire measuring device 210 may be mounted in a forward portion of the platform portion just behind the one or more wire manipulators 208 and may be used to test a height and a stagger of the contact wire above the top of rail. The stagger may be a distance of the contact wire away from the center of the set of tracks. Typically, the stagger is not much more than 12 inches each side of centerline of the set of tracks. The height of the contact wire from top of rail varies a lot, even in the same single wire run. For example, when the rail goes under a low bridge the wire height will drop lower, if freight trains run on the same line the wire will be higher. Thus, for example, a contact wire height may be as low as 13 ft. from top of rail and as high as 26 ft. 6 inches from top of rail.

The aerial device 212 may be located towards the rear of the platform portion of the truck and may allow an operator to assist with the wire installation process and method. The aerial device 212 may have an elevator portion 250 (not shown in FIG. 1, but more clearly shown in FIGS. 4 and 6-7D) and a platform 252 located at the end of the arm into which a number of users and equipment may be placed and then lift the user and equipment above the ground. The aerial device 212 may support 2000 pounds and rotate relative to the truck body as described below. The aerial device 212 may be hydraulically actuated and may be an elevator lift system manufactured and commercially sold by various different manufacturers, such as Altec. An example of the platform extended is shown in FIG. 4. The catenary wire installation truck 200 may also have two sets of rail gears 214 that are attached to the underbody of the truck (as shown in FIG. 7) adjacent a front set of wheels and a back set of wheels, respectively, of the truck. Each rail gear 214 moves from a stored position in which the wheels of the rail gear do not contact a set of tracks and the truck may be driven on a road to an engaged position in which the wheels of the rail gear contact a set of tracks (and lift the wheels of the truck up so that the truck wheels do not contact the road) so that the truck may be moved along the set of tracks such as in shown in FIG. 12.

The installation truck 200 may also have a creep drive motor and a creep drive pump (collectively, a "creep drive system") mounted underneath the truck. The creep drive system allows the truck, once it is on the set of tracks to be moved along the set of tracks without a driver in the cab of the truck because the movement of the truck is done using the creep drive system and a control unit. When the creep drive system is engaged and moving the truck along the set of tracks, the engine of the truck may be placed into neutral. The creep drive system may be a hydraulic system that may use the creep drive pump to pressurize the hydraulic system and pump the hydraulic fluid that operates the system. For example, the creep drive system may be a commercially available Addidrive creep drive system manufactured and sold by Poclain Hydraulics. It is known how to install such as creep drive system in a truck. The creep drive system may be used to allow a user in standing on the platform of the aerial 212 installing the wire (as described below in more detail) and then control the movement of the truck along the set of tracks using the creep drive system and the control unit that is connected to the creep drive system but may be located on the platform of the aerial so that the control unit may be operated by the person in the platform.

The truck may also have a remote control device for moving the catenary wire installation truck along the set of tracks. The remote control device, that may be detachably mounted to the bucket so that a person in the bucket can control various function of the truck, may be used to independently control the creep drive, the wire manipulators 208 and the wire measuring device 210. For example, the control device may have a layout (when used with the implementation that has two wire manipulator arms) with a first wire manipulator control portion that has the control elements to control the first wire manipulator, a second wire manipulator control portion that has the control elements to control the second wire manipulator independent of the first wire manipulator, a creep drive portion with control elements for controlling the creep drive system and a bucket control portion for controlling the aerial and the bucket positioning. The control device also may have controls elements to control the wire measuring device. The control device may be connected to the various systems of the truck wirelessly or via a cable.

Figure 5:
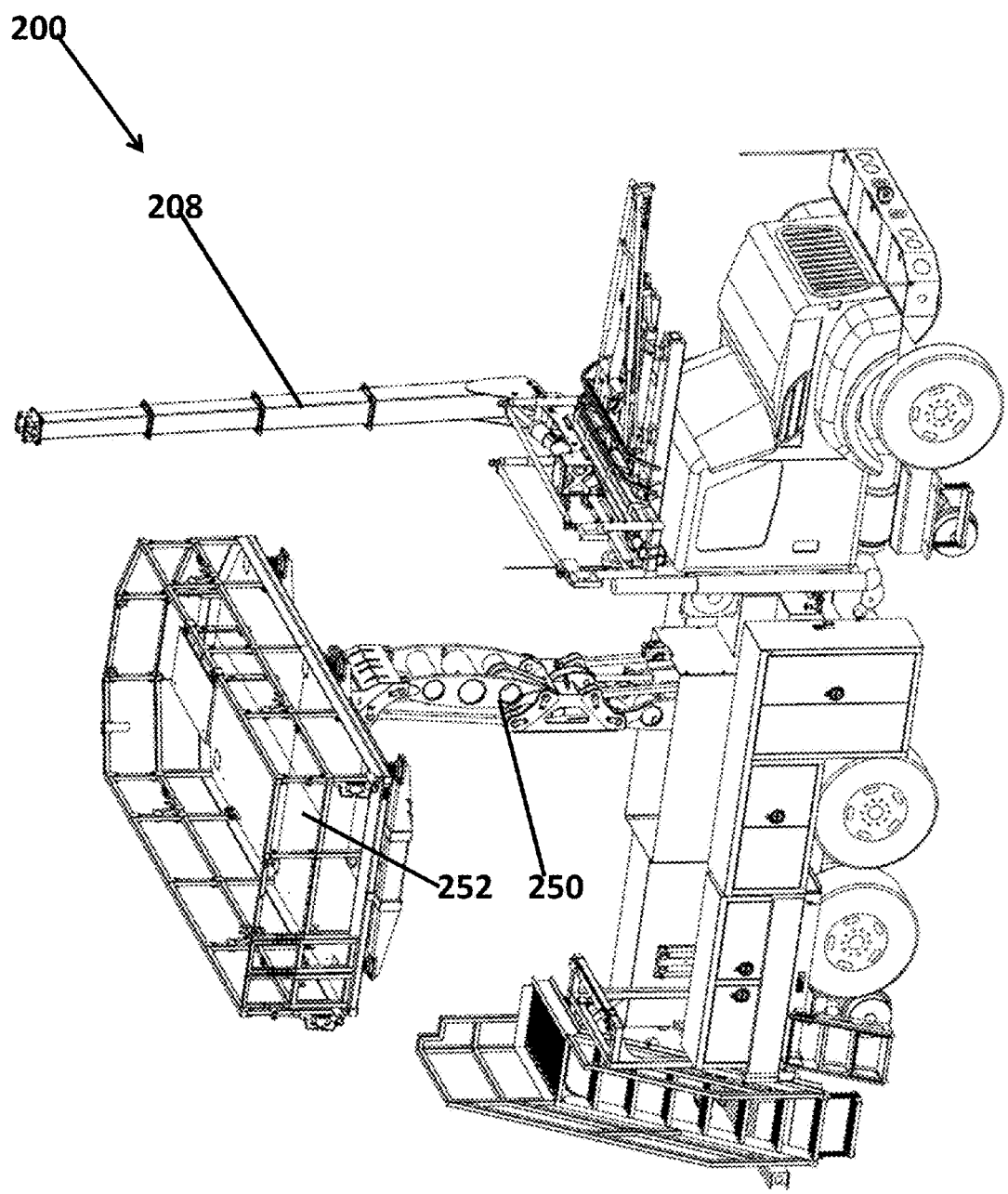
FIG. 5 shows the catenary platform truck with the wire manipulator extended and the platform extended and rotated 90 degrees relative to the truck body.

FIG. 5 shows the catenary platform truck 200 with the wire manipulator 208 extended and the platform 252 extended and rotated 90 degrees relative to the truck body. In this position, one or more users on the platform are able to install or maintain catenary wire.

Figure 6:
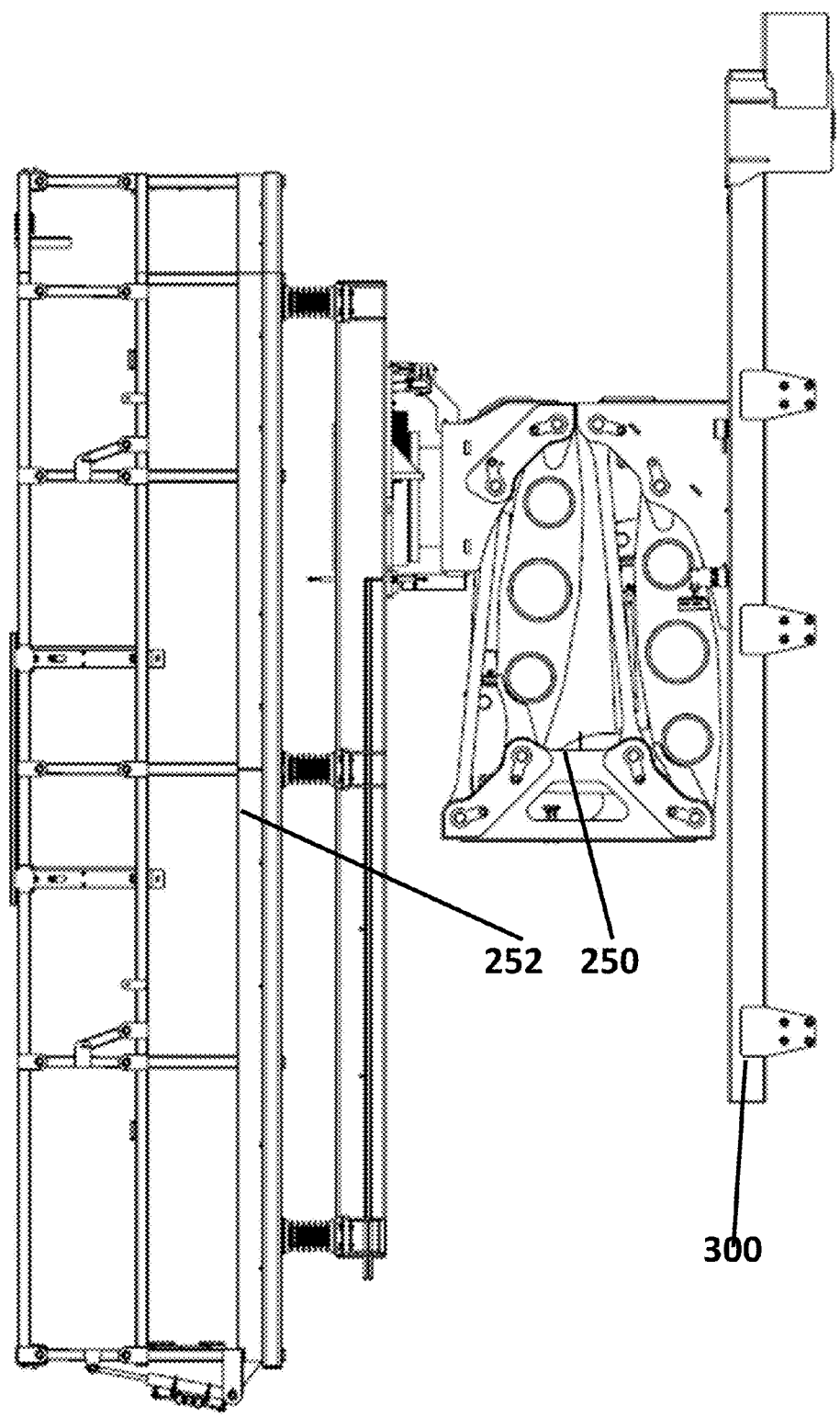
FIG. 6 illustrates a platform lift mechanism.

FIG. 6 illustrates a platform lift mechanism 212. The platform lift mechanism 212 has a base portion 300 that attaches to the truck body and the lift mechanism 250 and the lift mechanism 250 is rotatable coupled to the platform 252 that allows the platform to rotate relative to the truck. In one embodiment, the platform may rotate up to 90 degrees either way of in line with the truck (but may be rotated as smaller angle as desired. As shown in FIGS. 6-7D, the lift mechanism may be an elevator lift. Prior art system used a three stage telescoping hydraulic cylinder to raise/lower the platform and the cylinder was very sensitive and required rebuilding or replacing often. Furthermore, the capacity of the prior art platform was 750-1000 lbs. In addition, the length of the telescoping cylinder the platform height in the stowed position was above the cab of the truck which made access much harder. Other prior art systems used a scissor lift that was heavy, reduced truck payload capacity and took up more space.

In embodiments of the system, the lift mechanism 250 may be a commercially available shelf elevator device manufactured and sold by Altec. Other embodiments may use other lift mechanisms such as those sold by Terex Utilities or other manufacturers. In accordance with each embodiment, the platform 252 may have a 2000 lb. platform capacity that allows more people and/or materials to be lifted by the platform to install or maintain the catenary wires. Furthermore, the platform 252 of the trust 200 may be insulated to 5 Kv. As shown in FIG. 5, the platform 252 may be attached to the lift mechanism 250 and the other end of the platform 252 may be rotated along the long end of the platform 252 to reach farther out over the side of the truck 200 and the short end (adjacent the lifting mechanism 212) to stay within the envelope of the truck body and not foul the adjacent track. In the truck 200, the stowed position of the platform 252 is lower than the telescoping platform which allows for safer and easier access.

Figure 7A:
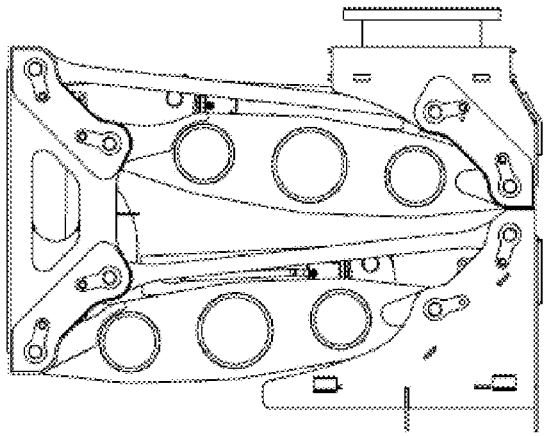
FIGS. 7A-D illustrate further details of the platform lift mechanism.
Figure 7B:
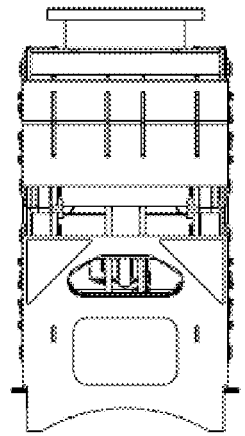
Figure 7C:
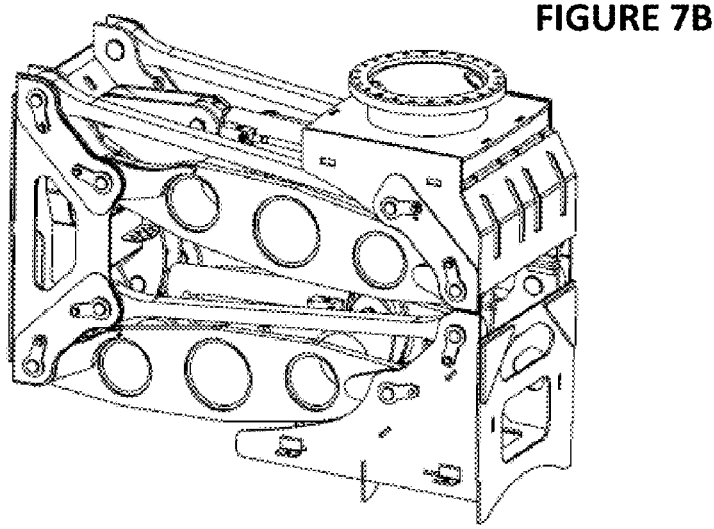
Figure 7D:
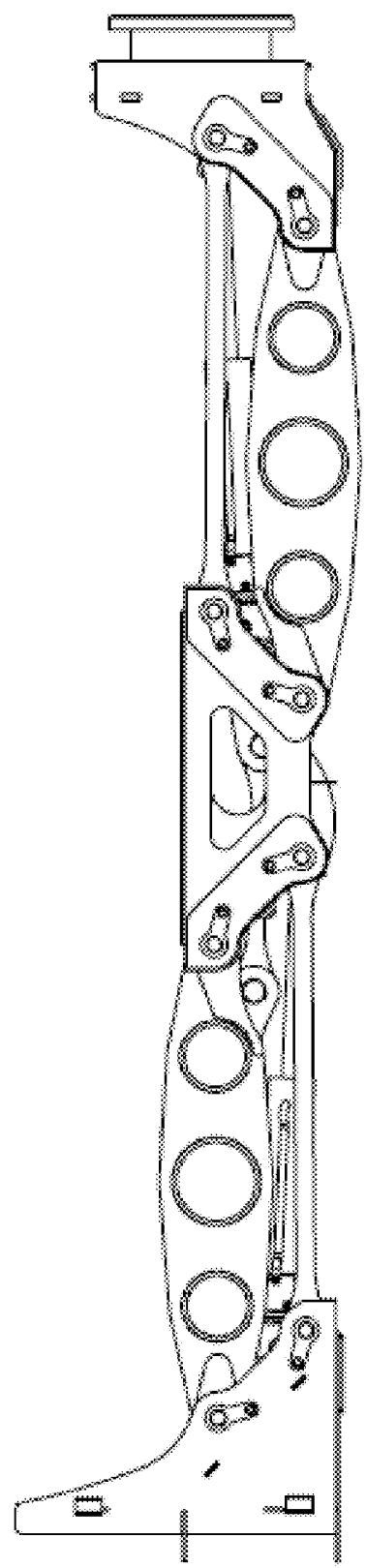

FIGS. 7A-D illustrate further details of the platform lift mechanism 252. FIGS. 7A-7C illustrate various views of the lifting mechanism. FIG. 7D illustrates the lift mechanism 252 extended to its outstretched length.

Figure 8:
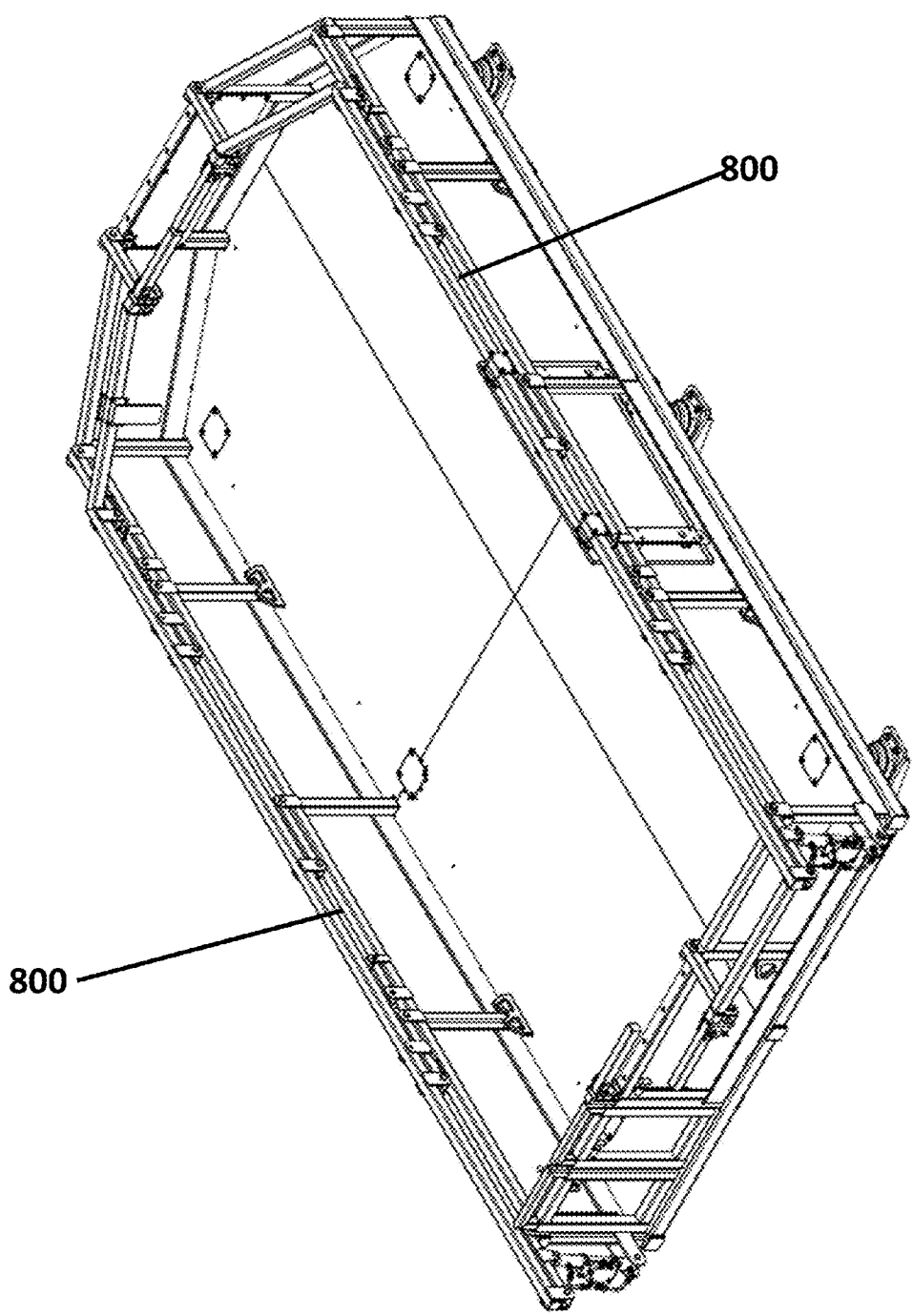
FIG. 8 shows the guard rails of the platform in an unextended/stowed position.
Figure 9:
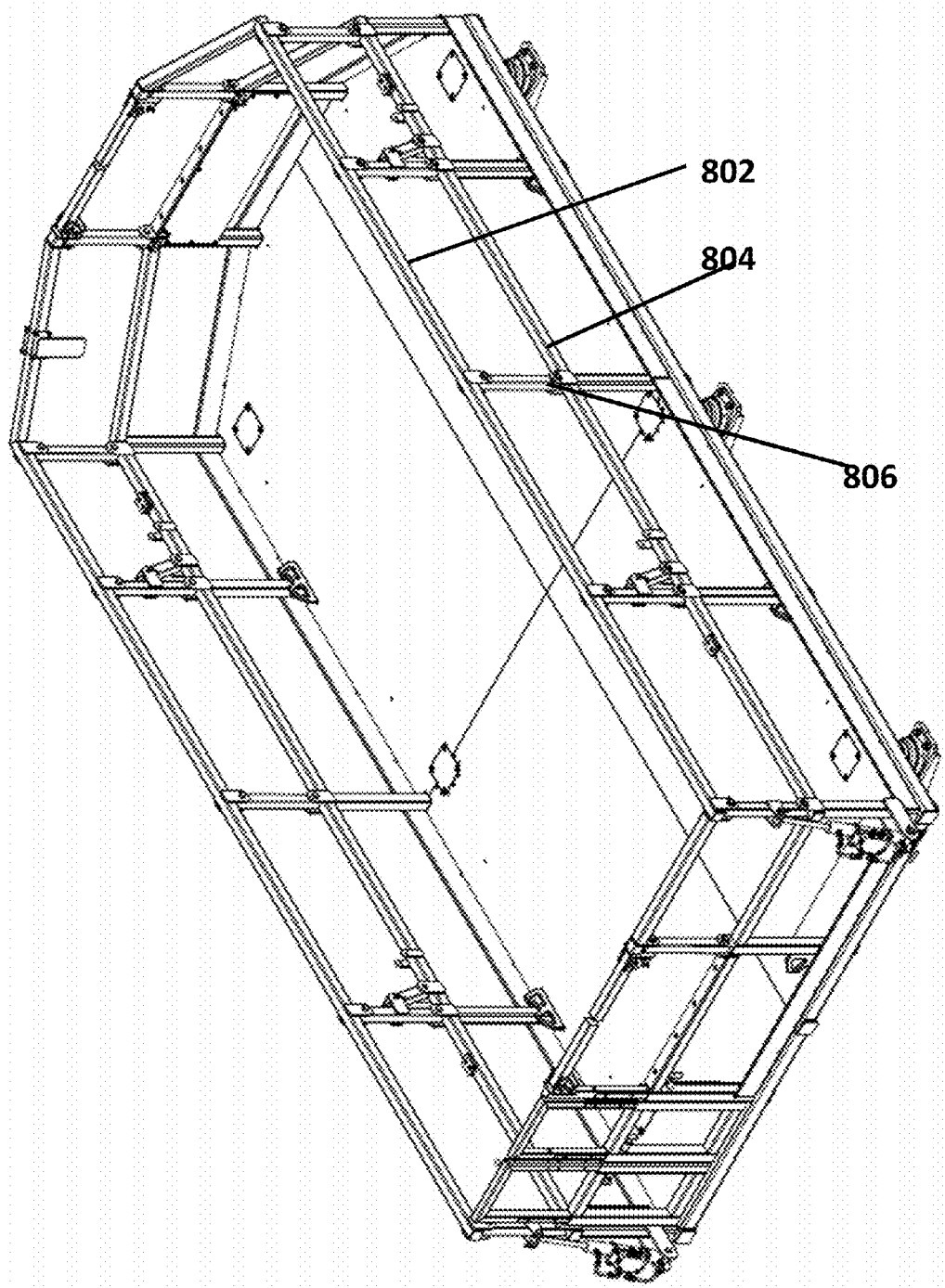
FIG. 9 shows the guard rails of the platform in an extended, locked position.

FIG. 8 shows the guard rails 800 of the platform in an unextended position and FIG. 9 shows the guard rails 800 of the platform in an extended, locked position. The guard rail 800 of the platform was built so that it easily folds down for legal height while traveling over the road. The guard rail 800 also adjust to allow the contact wire under the top rail to gain access to the messenger wire above. As shown in FIGS. 8-9, the guard rail 800 is around the periphery of the platform 252 and the guard rail 800 may be extended (and locked) when one or more people are on the platform performing work. As shown in FIG. 9, the guard rail 800 for each portion of the platform has a first horizontal portion 802, a second horizontal portion 804 and a post portion 806 as shown. The various portions of the guard rail 800 may be rotatable connected to each other so that the guard rail 800 may move between the unextended position and the extended position.

Figure 10A:
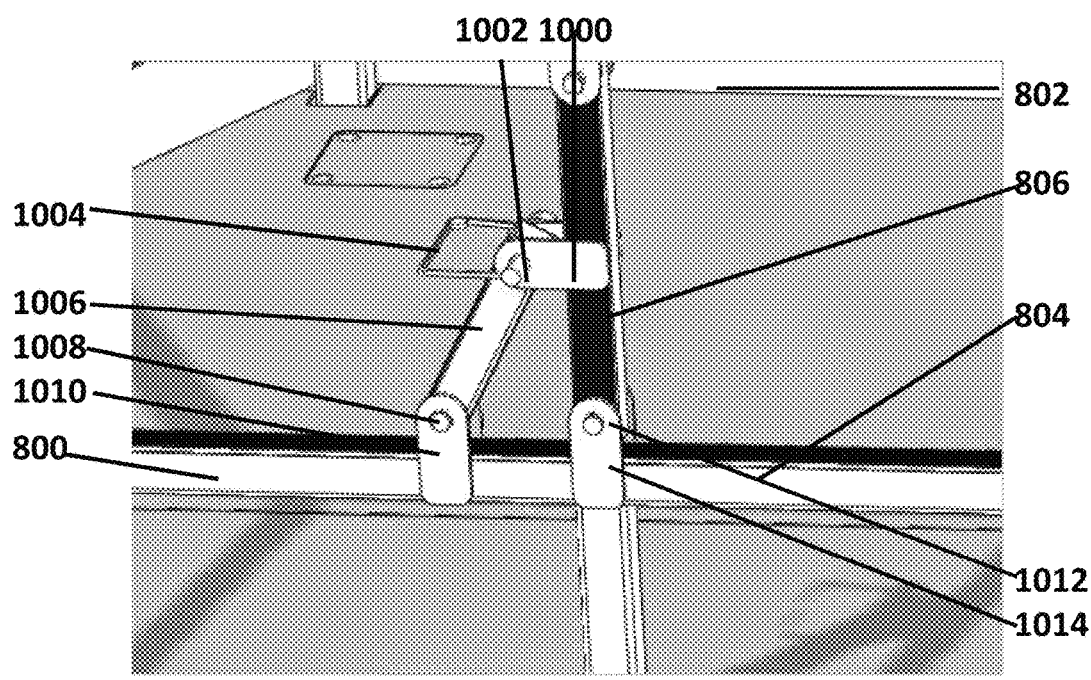
FIGS. 10A and 10B illustrates a locking mechanism for the guard rails.
Figure 10B:
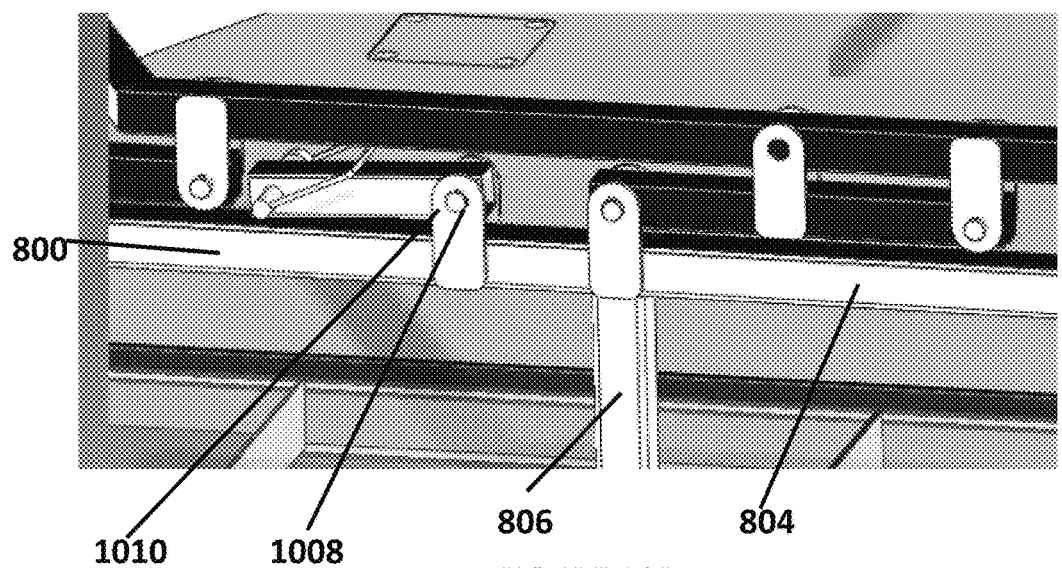

FIGS. 10A and 10B illustrates a locking mechanism for the guard rails 800 that allow permit the guard rails 800 to move from a stowed position to an extended position. Each guard rail 800 may further comprise a first portion 1000 that is connected to the vertical portion 806 of each guard rail portion 800 and the first portion has a pivot portion 1002 that allows the rotation as shown in FIG. 10B so that the guard rails 800 can be moved from a stowed position to an extended position and locked. Each guard rail 800 may further comprise a clevis or lock pin portion 104 that is used to lock the guard rails into the extended position, a connection portion that is rotatably connected to the pivot point 1002 of the first portion and rotatably connected to a vertical portion 1010 at a pivot point 1008 of the vertical portion 1010. The vertical portion 1010 is connected to the horizontal member 804 of the guard rail 800. Each guard rail 800 may further comprise a second vertical portion 1010 that has a pivot point 1012 that is connected to the horizontal member 804 and rotatably connected to the vertical portion 806. Each of the portions shown in FIGS. 10A and 10B allow the various portions of the guard rails 800 to be moved from the stowed position to the extended position and permit the guard rails to be locked into position when in use.

Figure 11:
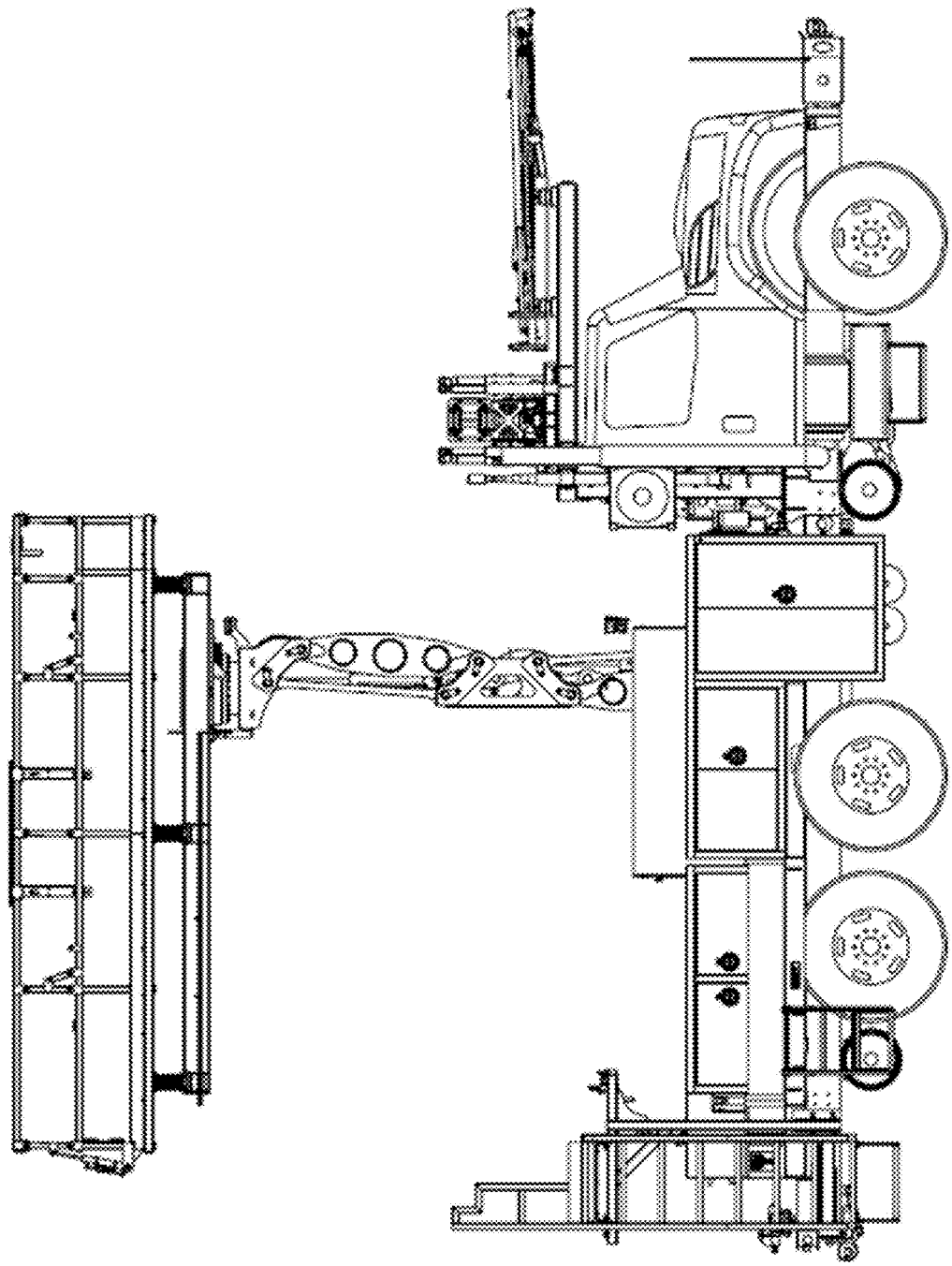
FIGS. 11 and 12 illustrate the catenary platform truck with the platform extended for installing or maintaining the catenary wire.
Figure 12:
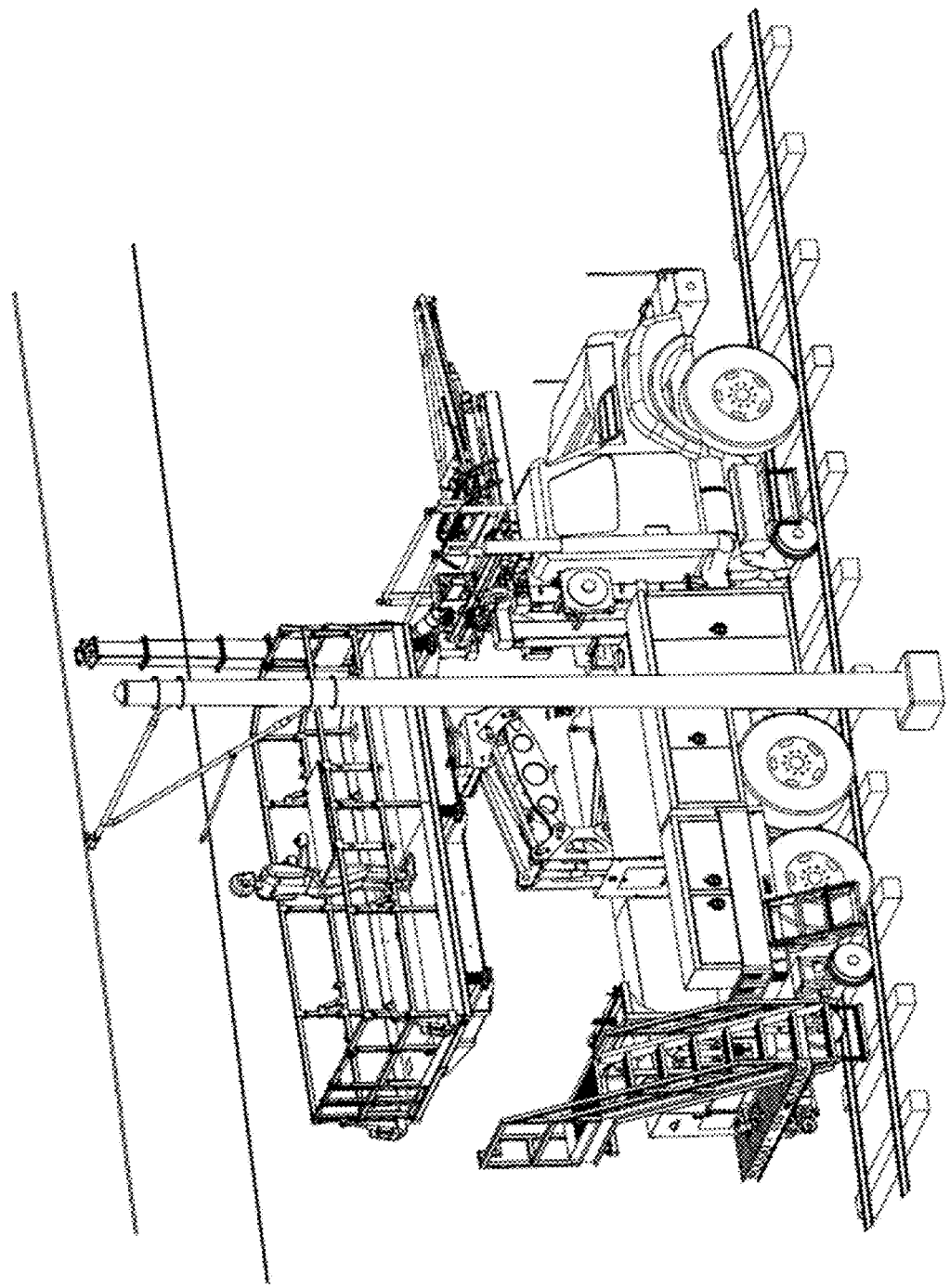

FIGS. 11 and 12 illustrate the catenary platform truck with the platform extended for installing or maintaining the catenary wire. As shown in these figures, the truck 200 may be riding on the rails using the rail gears and the platform 252 may be extended to permit the installation/repair of the catenary wire of a catenary wire system.

The platform truck 200 may operate without outriggers on a side slope or super elevated track up to 6 degrees. Typical catenary truck system may incorporate outriggers in order to handle side slope or super elevated track up to 6 degrees. The standard for truck mounted aerial lifts per ANSI A92.2 is 5 degrees, but 6 degrees captures of a maximum super elevation used by tracks.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A wire installation apparatus for an electric transportation system that uses a set of tracks with a messenger wire and a contact wire suspended above a set of tracks, comprising:
   a truck body;
   a lifting mechanism connected to the truck body, the lifting mechanism being an elevator mechanism;
   a platform connected to the lifting mechanism that is movable between a stowed position and an extended position, the platform having a rectangular shape with a first end and a second end wherein the lifting mechanism is connected at the first end and the platform is capable of rotating with respect to the truck body;
   a wire manipulator coupled to the truck body in front of and adjacent to the platform, the wire manipulator having a first wire manipulator arm and a second wire manipulator arm that are each directly connected to the truck body and independently controlled, the first and second wire manipulator arms being used to separately hold an already installed messenger wire and an already installed contact wire of the electric transportation system; and
   a contact wire measuring device, adjacent to and separate from the wire manipulator, for testing a height of the contact wire above the set of tracks and a stagger of the contact wire relative to the set of tracks.

2. The apparatus of claim 1, wherein the platform further comprises a guard rail that encircles a periphery of the platform.

3. The apparatus of claim 2, wherein the guard rail has a stowed position when the guard rail is adjacent to the platform and an extended position when the guard rail is extended away from the platform wherein the guard rail rotates between the stowed position and the extended position.

4. The apparatus of claim 1 further comprising a creep drive device coupled to the truck body that allows the truck to be remotely moved.

5. The apparatus of claim 4, wherein the creep drive device further comprises a creep drive motor.

6. The apparatus of claim 1 further comprising two rail gear devices that allow the truck body to move along a set of tracks.

7. The apparatus of claim 6, wherein the two rail gear devices are coupled to the truck body adjacent to a front set of wheels and a back set of wheels of the truck body.

8. The apparatus of claim 1 further comprising a control unit coupled to the wire manipulator and a wire measuring device that allows an operator to control each of the wire manipulator and the wire measuring device using the control device.

* * * * *